(12) United States Patent
Zinszer et al.

(10) Patent No.: US 8,091,904 B1
(45) Date of Patent: Jan. 10, 2012

(54) DIVER'S STATION AND UMBILICAL CART

(75) Inventors: Michael A. Zinszer, Panama City, FL (US); Daniel Walsh, Lynn Haven, FL (US); Terry Johnson, Panama City, FL (US)

(73) Assignee: FSU Research Foundation

( * ) Notice: Subject to any disclaimer, the term of this patent is extended or adjusted under 35 U.S.C. 154(b) by 216 days.

(21) Appl. No.: 12/460,581

(22) Filed: Jul. 20, 2009

Related U.S. Application Data

(60) Provisional application No. 61/135,229, filed on Jul. 18, 2008.

(51) Int. Cl.
*B62B 1/00* (2006.01)
*B62D 61/12* (2006.01)
*A47F 7/00* (2006.01)

(52) U.S. Cl. ............... 280/47.19; 280/652; 280/654; 280/43; 280/47.21; 280/47.41; 211/85.7

(58) Field of Classification Search ............ 280/35, 280/651, 652, 654, 43, 47.131, 47.17, 47.18, 280/47.19, 47.21, 47.23, 47.24, 47.26, 47.35, 280/79.3, 47.34, 47.38, 47.4, 47.41, 79.2; 211/13.1, 189, 85.7, 85.18
See application file for complete search history.

(56) References Cited

U.S. PATENT DOCUMENTS

| | | | | |
|---|---|---|---|---|
| 2,375,363 | A * | 5/1945 | Hokanson | 280/47.34 |
| 2,605,117 | A * | 7/1952 | Hooz et al. | 280/43 |
| 3,326,553 | A * | 6/1967 | Forrest | 473/445 |
| 4,422,658 | A * | 12/1983 | Hilliard | 280/47.4 |
| 5,489,109 | A * | 2/1996 | Murphy | 280/415.1 |
| 6,059,127 | A * | 5/2000 | Bennett | 211/85.18 |
| 6,308,967 | B1 * | 10/2001 | Stallbaumer et al. | 280/47.18 |
| 7,357,262 | B2 * | 4/2008 | Fratilla | 211/117 |
| 7,770,743 | B1 * | 8/2010 | Janowak et al. | 211/119.12 |
| 2006/0054576 | A1 * | 3/2006 | Durham | 211/85.7 |
| 2008/0054579 | A1 * | 3/2008 | Liu | 280/35 |
| 2009/0309323 | A1 * | 12/2009 | Oliver | 280/47.17 |

* cited by examiner

*Primary Examiner* — John R Olszewski
(74) *Attorney, Agent, or Firm* — Peter Loffler

(57) ABSTRACT

A diver's station and umbilical cart neatly stores the umbilical cord and other various items used in hookah diving and has a frame made from various bars of aluminum stock. A set of wheels is pivotally attached to one end of the frame while a handle is attached to an opposing end. A seat is telescoping attached to the frame proximate the wheels. A first set of legs extends upwardly from the frame proximate the handle and has a first tray there atop, while a second set of legs extends upwardly from the frame between the first legs and the seat and has a second tray there atop. A telescoping post extends upwardly from the frame and passes through the second tray, the post having a T-brace there atop.

27 Claims, 5 Drawing Sheets

DIVER'S STATION AND UMBILICAL CART

This application claims the benefit of provisional patent application No. 61/135,229 filed on Jul. 18, 2008, which is incorporated on its entirety herein by reference.

BACKGROUND OF THE INVENTION

1. Field of the Invention

This invention relates to a diver's cart used for surface supplied diving wherein the cart carries, in organized fashion, the umbilical cord, the diver's helmet, the reserve tank, and also provides seating for the support person assisting the diver.

2. Background of the Prior Art

In SCUBA diving, a diver carries one or more tanks, typically strapped to the diver's back, which tanks carry compressed air, giving the diver complete freedom to maneuver under water as the diver sees fit. However, as the compressed air in the tanks is finite, typically on the order of about one hour per tank, the diver's time underwater is also finite. Such finite submersion rarely presents much of an obstacle to a recreational diver as one to two hours underwater provides for a fulfilling afternoon. However, for professional divers, such as those doing recovery, underwater repairs, munitions work, etc., frequent surfacing can be a major drawback, especially if the dive is relatively deep, requiring the diver to decompress with each tank replenishing surface.

To eliminate the finite nature of compressed air tanks, surface supplied or hookah diving is employed. In surface supplied diving, the diver submerges without the typical compressed air tanks and instead receives the life necessary air supply directly from the surface or indirectly from a diving bell. A gas or electric operated air compressor feeds the air to the diver via an umbilical cord, the air passing through an air reserve tank. So long as the compressor has fuel and does not otherwise malfunction, the diver is supplied with air and can remain submerged indefinitely. In case of a compressor failure, sufficient air remains in the reserve tank to give the diver sufficient air supply in order to be able to safely surface. Due to the extreme nature of the dive, most surface supplied divers wear a diving helmet which is typically a brass helmet with a glass view window. Such helmets protect the diver's head, allow the diver to have communications with the surface, and seal the diver's face so that should a diver become unconscious during the dive, the diver's lungs will continue to ingest breathing air being supplied by the compressor, which is not the case when using a demand regulator as is typical in SCUBA diving.

One of the problems that surface supplied diving teams find is in the transport and management of the necessary diving equipment especially the umbilical cord. As the umbilical cord is relatively thick, the cord can be quite difficult to handle and transport especially in the case of a relatively long cord. Oftentimes, the cord is thrown into the back of a pickup truck or trailer and thereafter untangled at the time of the next usage.

What is needed is a device that can easily and adequately manage and transport the umbilical cord used in surface supplied diving without the fear of the cord becoming tangled. Ideally, such a device should be able to carry other supplies used during the dive and should also provide equipment and personal management during the dive. Such a device must be of relatively simple design and construction and be relatively easy to use and maintain.

SUMMARY OF THE INVENTION

The diver's station and umbilical cart of the present invention addresses the aforementioned needs in the art by providing a cart that easily and adequately holds and transports the umbilical cord used in surface supplied diving without the fear of the cord becoming tangled. The diver's station and umbilical cart is able to hold and carry other supplies used during the dive and also provides equipment and personal management during the dive. The diver's station and umbilical cart is relatively simple in design and construction and is relatively easy to use and maintain.

The diver's station and umbilical cart of the present invention is comprised of a generally rectangular shaped frame that has a first end, an opposing second end, an upper surface, and a lower surface. The frame is comprised of a pair of parallel longitudinal bars joined by a pair of parallel latitudinal bars. A pair of wheels are pivotally attached to the first end of the frame. A seat bottom is attached to a first one of the pair of latitudinal bars. A first set of support legs extends upwardly from the upper surface of the frame proximate the second end such that the first set of support legs has a first tray thereon. A second set of support legs extends upwardly from the upper surface of the frame between the first set of support legs and the seat such that the second set of support legs has a second tray thereon. A first post extends upwardly from the upper surface of the frame and passing through the second tray such that first post has a T-brace on an end thereof. The first post is telescoping such that the T-brace is capable of telescoping between retracted position sitting atop the second tray and an extended position above the second tray. A handle is attached to a second one of the pair of latitudinal bars. A seat back is hingedly attached to the seat. The seat is attached to the frame via a second post that extends upwardly from the first one of the pair of latitudinal bars. The second post is telescoping. The wheels are capable of pivoting between an extended position and a retracted position such that a retainer bracket is attached to the wheels and is removably receivable within a first notch or a second notch in order to hold the wheels in the extended position or retracted position respectively. A longitudinal brace extends between the pair of latitudinal bars and is generally parallel with the pair of longitudinal bars. A latitudinal brace extends between the pair of longitudinal bars and generally parallel with the pair of latitudinal bars. Two of the second set of support legs extend upwardly from the latitudinal brace, a third leg of the second set of support legs extends upwardly from the longitudinal brace, and the second post extends upwardly from the longitudinal brace. Two of the first set of support legs extend upwardly from another latitudinal brace and a third leg of the first set of support legs extends upwardly from the longitudinal brace.

BRIEF DESCRIPTION OF THE DRAWINGS

Similar reference numerals refer to similar parts throughout the several views of the drawings.

DESCRIPTION OF THE PREFERRED EMBODIMENT

Figure 1:
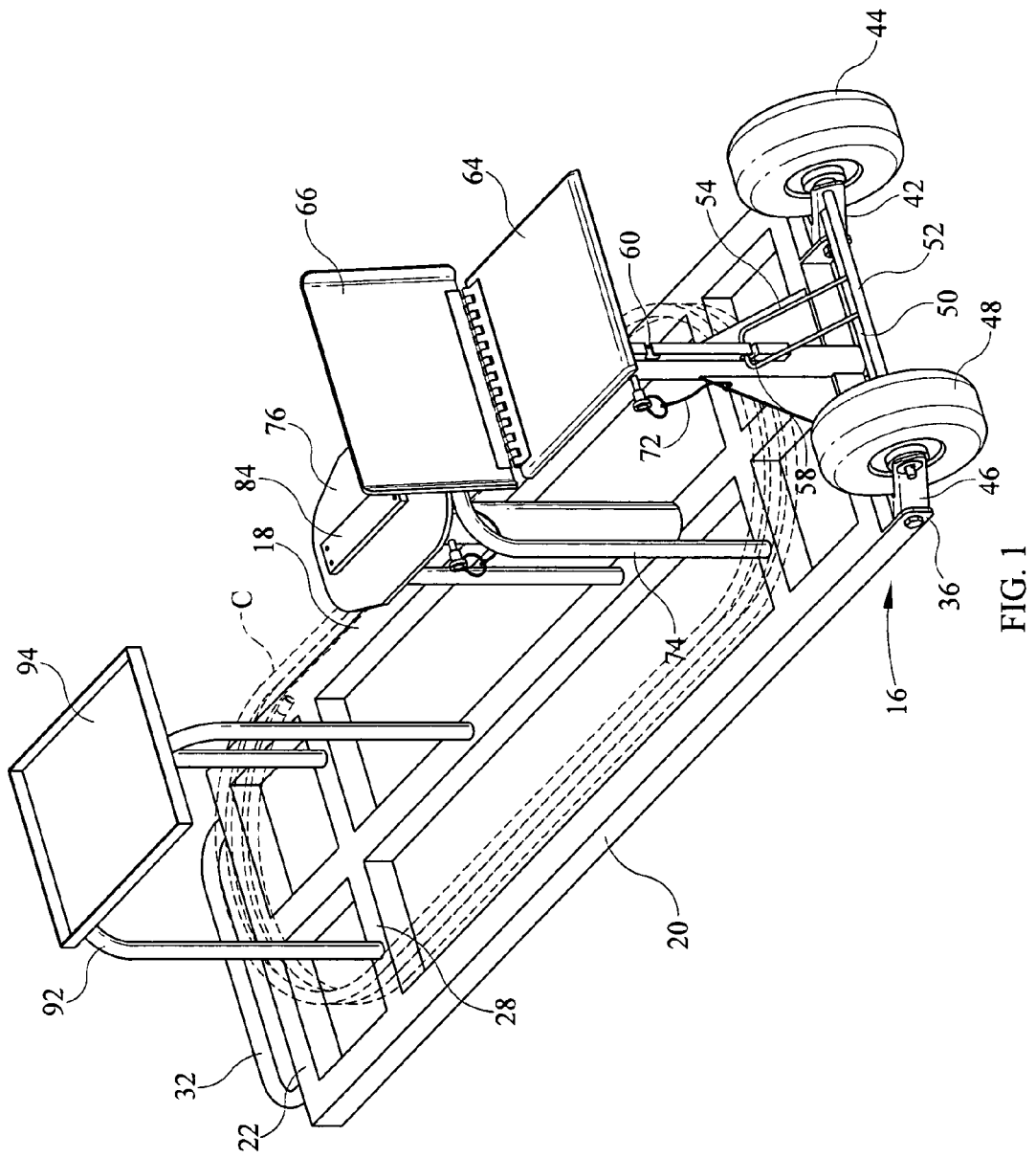
FIG. 1 is a perspective view, from the rear, of the diver's station and umbilical cart of the present invention.
Figure 2:
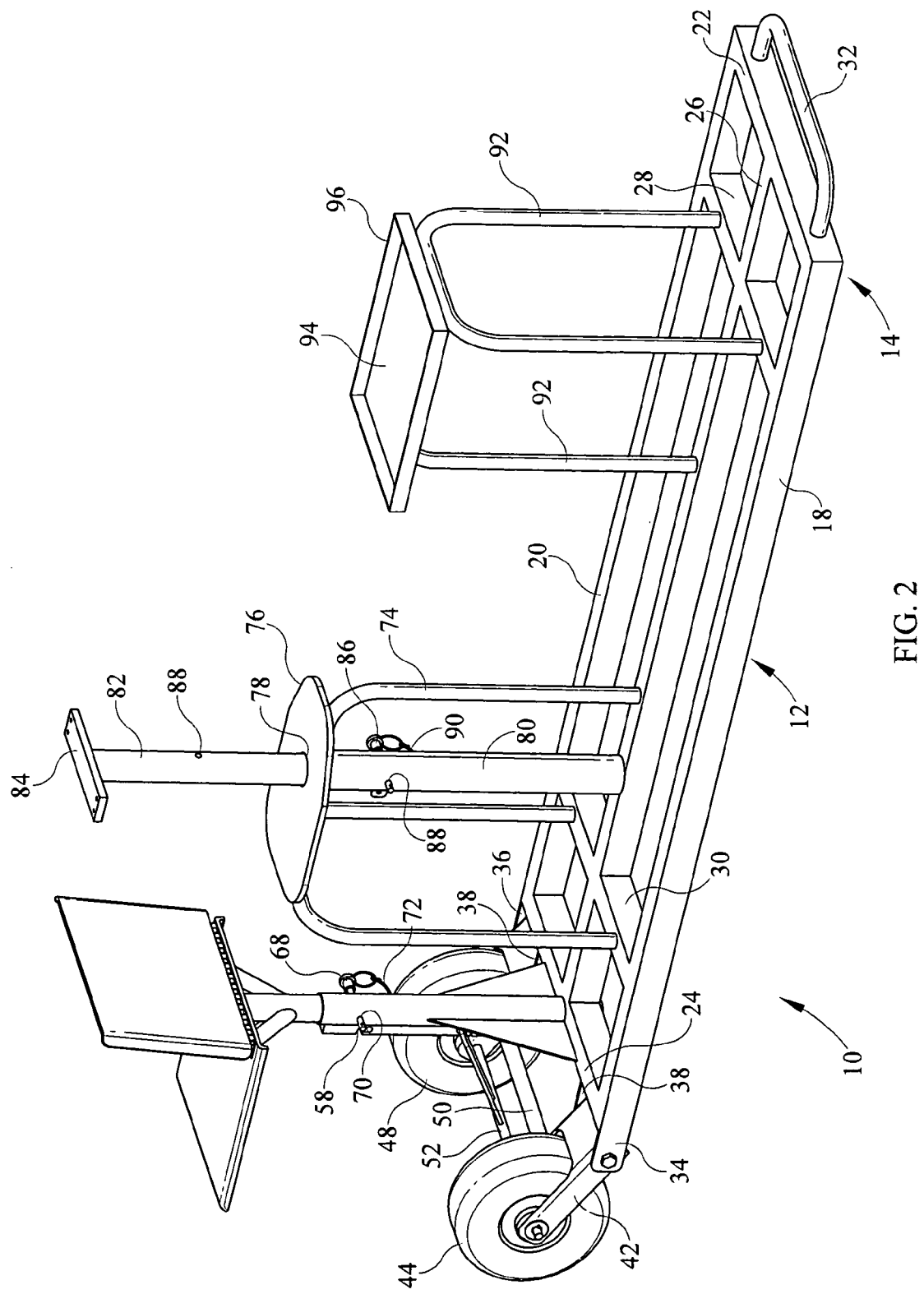
FIG. 2 is a perspective view, from the front, of the diver's station and umbilical cart.
Figure 3:
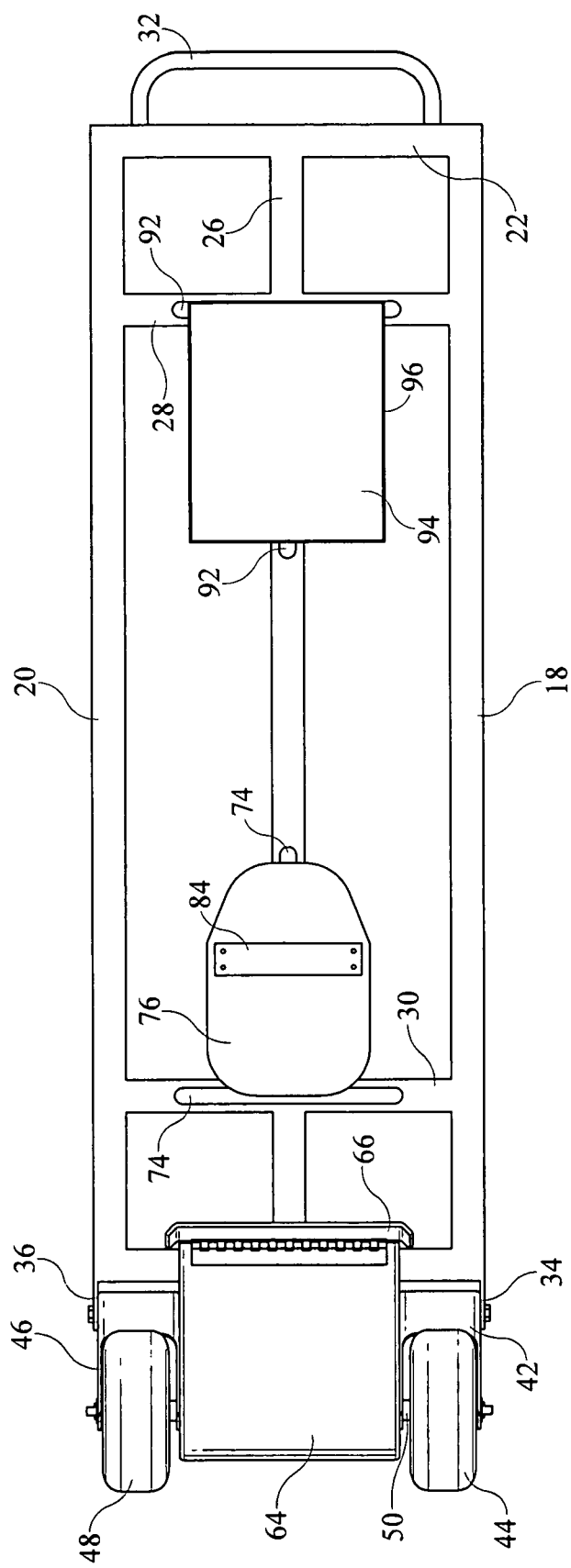
FIG. 3 is a top plan of the diver's station and umbilical cart.

Referring now to the drawings, it is seen that the diver's station and umbilical cart of the present invention, generally denoted by reference numeral 10, is comprised of a generally rectangular shaped frame member 12 that has a first end 14 and a second end 16. The frame member 12 comprises a first longitudinal bar 18 and a coextensive second longitudinal bar 20, the two bars 18 and 20 connected by a first latitudinal bar 22 at the first end 14 and a second latitudinal bar 24 at the second end 16. A centrally passing longitudinal brace bar 26 extends between the first latitudinal bar 22 and the second latitudinal bar 24 coextensive with the two longitudinal bars 18 and 20, while a first latitudinal brace bar 28 extends between the two longitudinal bars 18 and 20 and passes through the longitudinal brace bar 26 and is offset from the first latitudinal bar 22, while a second latitudinal brace bar 30 extends between the two longitudinal bars 18 and 20 and passes through the longitudinal brace bar 26 and is offset from the second latitudinal bar 24. Each of the components of the frame member 12 is made from aluminum square stock or similar material and welded together at all appropriate points of attachment between the various elements. As seen, a handle 32 is attached to the first latitudinal bar 22.

As seen, a first flange 34 extends rearwardly from the first longitudinal bar 18 at the bar's joiner with the second latitudinal bar 24, while a second flange 36 extends rearwardly from the second longitudinal bar 20 at this bar's joiner with the second latitudinal bar 24. A third flange 38 extends rearwardly from the second latitudinal bar 24 and is offset and coextensive with the first flange 34, while a fourth flange 40 extends rearwardly from the second latitudinal bar 24 and is offset and coextensive with the second flange 36. A first wheel support 42 holding a first wheel 44 is pivotally attached to the first flange 34 and third flange 38 while a second wheel support 46 holding a second wheel 48 is pivotally attached to the second flange 36 and the fourth flange 40. An axle 50 connects the first wheel 44 and the second wheel 48 and passes through the pair of supports 42 and 46. A cross bar 52 is rotatably connected to the first wheel support 42 and the second wheel support 46. A retainer bracket 54 is attached to the cross bar 52.

Figure 4:
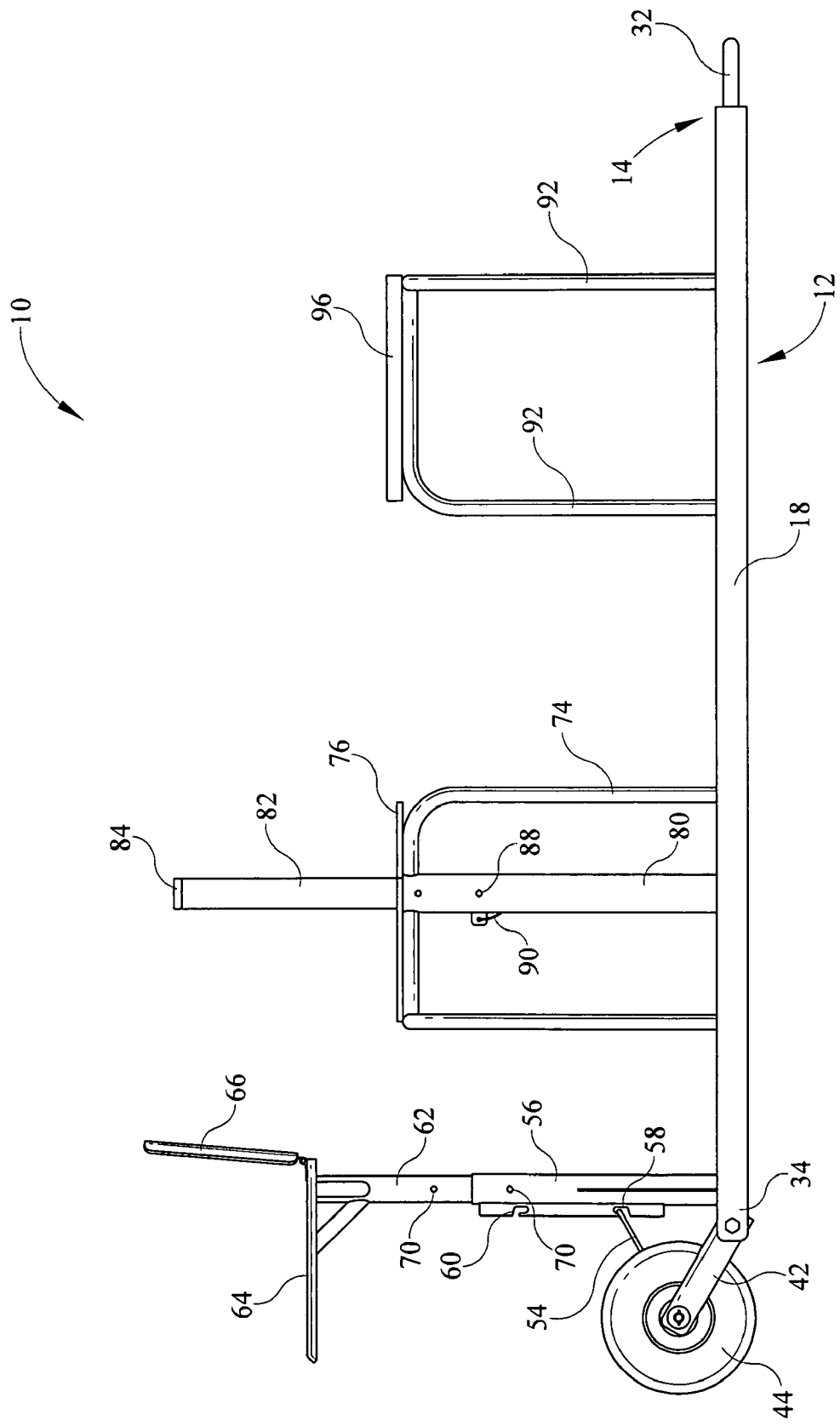
FIG. 4 is a side elevation of the diver's station and umbilical cart in a deployed position.
Figure 5:
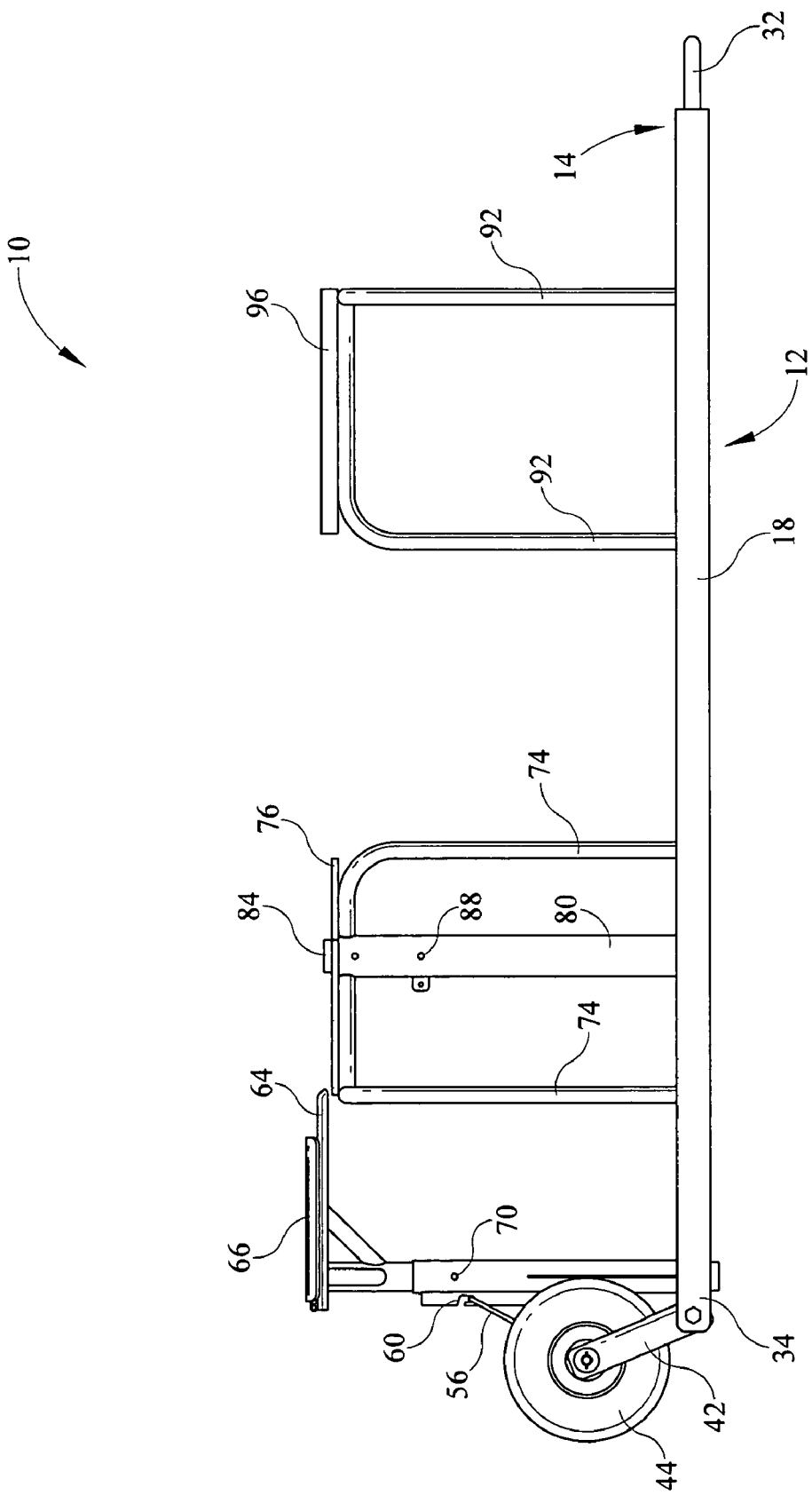
FIG. 5 is a side elevation of the diver's station and umbilical cart in a storage position.

A first lower support post 56 extends upwardly from the second latitudinal bar 24. As seen, this first lower support post 56 has a first notch 58 and at least one second notch 60 located above the first notch. 58. The first notch 58 and the second notch 60 are designed to removably receive the top of the retainer bracket 54 so the wheels 44 and 48 may be pivoted to a deployed position, as seen in FIG. 4, so that the retainer bracket 54 is received within the first notch 58 thereby retaining the wheels 44 and 48 in such deployed position or the wheels 44 and 48 may be pivoted to a retracted position, as seen in FIG. 5, so that the retainer bracket 54 is received within the second notch 60 thereby retaining the wheels 44 and 48 in such retracted position. A first upper support post 62 is slidably received within the first lower support post 56 with a seat bottom 64 located atop the first upper support post 62. A seat back 66 is hingedly attached to the seat bottom 64. The seat bottom 64 is capable of being raised or lowered by raising or lowering the first upper support post 62 within the first lower support post 56. A first locking pin 68 passes through corresponding openings 70 on the first lower support post 56 and the first upper support post 62 in order to lock the first upper support post 62 at its desired height. The first locking pin 68 is attached to the first lower support post 56 via a first lanyard 72.

A first set of support legs 74 extend upwardly from the frame member 12 with some of the first support legs 74 attached to the longitudinal brace bar 26 and some of the first support legs 74 attached to the second latitudinal bar 30. A first support tray 76 sits atop the first set of support legs 74, the first support tray 76 having an opening 78 therein. A second lower support post 80 extends upwardly from the longitudinal brace bar 26. A second upper support post 82 is slidably received within the second lower support post 80 and passes through the opening 78 of the first support tray 76. A T-brace 84 is located atop the second upper support post 82. The T-brace 84 is capable of being raised or lowered by raising or lowering the second upper support post 82 within the second lower support post 80. A second locking pin 86 passes through corresponding openings 88 on the second lower support post 80 and the second upper support post 82 in order to lock the second upper support post 82 at its desired height. The second locking pin 86 is attached to the second lower support post 80 via a second lanyard 90.

A second set of support legs 92 extend upwardly from the frame member 12 with some of the second support legs 92 attached to the longitudinal brace bar 26 and some of the second support legs 92 attached to the first latitudinal brace bar 28. A second support tray 94 sits atop the second set of support legs 92, the second support tray 94 having upwardly extending peripheral flanging 96.

The umbilical cord C is wrapped around the first support legs 74 and the second support legs 92 for neat and orderly holding of the umbilical cord C without fear of entanglement. The diver's helmet (not illustrated) is held by the second support tray 94 while the reserve tank (not illustrated) is held by the first support tray 76 and is further supported and strapped to the second upper support leg 82 and T-brace 84. The diver's station and umbilical cart 10 is maneuvered by a user via the handle 32 and rolled along on the wheels 44 and 48 when in the deployed position.

As seen in FIGS. 1-4, in the deployed position, the first upper support leg 62 is raised to a desired height and the seat back 66 is raised (and the seat 64 possibly rotated 180 degrees) in order to provide seating for a crew member. The second upper support leg 82 is raised (and possibly rotated 90 degrees) in order to support the reserve tank. The wheels 44 and 48 are in the deployed position to allow the diver's station and umbilical cart 10 to be easily moved about. The relatively flat nature of the first longitudinal bar 18, the second longitudinal bar 20, the first latitudinal bar 22, the second latitudinal bar 24, the longitudinal brace bar 26, the first latitudinal brace bar 28, and the second latitudinal brace bar 30 provide a stable ground resting platform.

As seen in FIG. 5, the diver's station and umbilical cart 10 is in a storage mode with the wheels 44 and 48 locked into the retracted position. The first upper support leg 62 is in the lowered position and the seat back 66 is folded horizontally onto the seat 64. The second upper support leg 82 is also in the lowered position such that the T-brace 84 sits atop the first support tray 76.

While the invention has been particularly shown and described with reference to an embodiment thereof, it will be appreciated by those skilled in the art that various changes in form and detail may be made without departing from the spirit and scope of the invention.

We claim:
1. A diver's station and umbilical cart comprising:
   a frame having a first end, an opposing second end, an upper surface, and a lower surface;
   a pair of wheels pivotally attached to the first end of the frame;
   a seat bottom attached to the upper surface of the frame proximate the first end;
   a seat back hingedly attached to the seat bottom;

a first set of support legs extending upwardly from the upper surface of the frame proximate the second end, the first set of support legs having a first fray thereon;

a second set of support legs extending upwardly from the upper surface of the frame between the first set of support legs and the seat, the second set of support legs having a second tray thereon; and a first post extending upwardly from the upper surface of the frame and passing through the second tray such that first post has a T-brace on an end thereof.

2. The diver's station and umbilical cart as in claim 1 wherein the first post is telescoping such that the T-brace is capable of telescoping between retracted position sitting atop the second tray and an extended position above the second tray.

3. The diver's station and umbilical cart as in claim 1 further comprising a handle attached to the second end of the frame.

4. The diver's station and umbilical cart as in claim 1 wherein the seat bottom is attached to the frame via a second post.

5. The diver's station and umbilical cart as in claim 4 wherein the second post is telescoping.

6. The diver's station and umbilical cart as in claim 4 wherein the wheels are capable of pivoting between an extended position and a retracted position such that a retainer bracket is attached to the wheels and is removably receivable within a first notch or a second notch in order to hold the wheels in the extended position or retracted position respectively.

7. The diver's station and umbilical cart as in claim 1 wherein the frame is comprised of a pair of parallel longitudinal bars joined by a pair of parallel latitudinal bars.

8. The diver's station and umbilical cart as in claim 7 further comprising a longitudinal brace extending between the pair of latitudinal bars and generally parallel with the pair of longitudinal bars.

9. The diver's station and umbilical cart as in claim 8 further comprising a latitudinal brace extending between the pair of longitudinal bars and generally parallel with the pair of latitudinal bars.

10. A diver's station and umbilical cart comprising:
    a generally rectangular shaped frame having a first end, an opposing second end, an upper surface, and a lower surface, the frame comprised of a pair of parallel longitudinal bars joined by a pair of parallel latitudinal bars;
    a pair of wheels pivotally attached to the first end of the frame;
    a seat bottom attached to a first one of the pair of latitudinal bars;
    a first set of support legs extending upwardly from the upper surface of the frame proximate the second end, the first set of support legs having a first tray thereon;
    a second set of support legs extending upwardly from the upper surface of the frame between the first set of support legs and the seat, the second set of support legs having a second tray thereon; and
    a telescoping first post extending upwardly from the upper surface of the frame and passing through the second tray such that first post has a T-brace on an end thereof such that the T-brace is capable of telescoping between retracted position sitting atop the second tray and an extended position above the second tray.

11. The diver's station and umbilical cart as in claim 10 further comprising a handle attached to a second one of the pair of latitudinal bars.

12. The diver's station and umbilical cart as in claim 10 further comprising a seat back hingedly attached to the seat bottom.

13. The diver's station and umbilical cart as in claim 10 wherein the seat bottom is attached to the frame via a second post that extends upwardly from the first one of the pair of latitudinal bars.

14. The diver's station and umbilical cart as in claim 13 wherein the second post is telescoping.

15. The diver's station and umbilical cart as in claim 13 wherein the wheels are capable of pivoting between an extended position and a retracted position such that a retainer bracket is attached to the wheels and is removably receivable within a first notch or a second notch in order to hold the wheels in the extended position or retracted position respectively.

16. The diver's station and umbilical cart as in claim 10 further comprising a longitudinal brace extending between the pair of latitudinal bars and generally parallel with the pair of longitudinal bars.

17. The diver's station and umbilical cart as in claim 16 further comprising a latitudinal brace extending between the pair of longitudinal bars and generally parallel with the pair of latitudinal bars.

18. The diver's station as in claim 17 wherein two of the second set of support legs extend upwardly from the latitudinal brace, a third leg of the second set of support legs extends upwardly from the longitudinal brace, and the second post extends upwardly from the longitudinal brace.

19. The diver's station as in claim 17 wherein two of the first set of support legs extend upwardly from the latitudinal brace and a third leg of the first set of support legs extends upwardly from the longitudinal brace.

20. A diver's station and umbilical cart comprising:
    a frame having a first end, an opposing second end, an upper surface, and a lower surface;
    a pair of wheels pivotally attached to the first end of the frame such that the wheels are capable of pivoting between an extended position and a refracted position such that a retainer bracket is attached to the wheels and is removably receivable within a first notch or a second notch in order to hold the wheels in the extended position or retracted position respectively;
    a seat bottom attached to the upper surface of the frame proximate the first end;
    a first set of support legs extending upwardly from the upper surface of the frame proximate the second end, the first set of support legs having a first tray thereon;
    a second set of support legs extending upwardly from the upper surface of the frame between the first set of support legs and the seat, the second set of support legs having a second tray thereon; and
    a first post extending upwardly from the upper surface of the frame and passing through the second tray such that first post has a T-brace on an end thereof.

21. The diver's station and umbilical cart as in claim 20 wherein the first post is telescoping such that the T-brace is capable of telescoping between retracted position sitting atop the second tray and an extended position above the second tray.

22. The diver's station and umbilical cart as in claim 20 further comprising a handle attached to the second end of the frame.

23. The diver's station and umbilical cart as in claim 20 wherein the seat bottom is attached to the frame via a second post.

24. The diver's station and umbilical cart as in claim 23 wherein the second post is telescoping.

25. The diver's station and umbilical cart as in claim 20 wherein the frame is comprised of a pair of parallel longitudinal bars joined by a pair of parallel latitudinal bars.

26. The diver's station and umbilical cart as in claim 25 further comprising a longitudinal brace extending between the pair of latitudinal bars and generally parallel with the pair of longitudinal bars.

27. The diver's station and umbilical cart as in claim 26 further comprising a latitudinal brace extending between the pair of longitudinal bars and generally parallel with the pair of latitudinal bars.

* * * * *